United States Patent
Pandey (10) Patent No.: US 8,990,863 B2
(45) Date of Patent: Mar. 24, 2015

(54) METHODS AND SYSTEMS FOR PROVIDING STATUS UPDATES ASSOCIATED WITH ONE OR MORE PENDING ORDERS

(75) Inventor: Siddharth Pandey, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1155 days.

(21) Appl. No.: 12/329,102

(22) Filed: Dec. 5, 2008

(65) Prior Publication Data

US 2010/0146558 A1  Jun. 10, 2010

(51) Int. Cl.
*H04N 5/445* (2011.01)
*H04N 21/478* (2011.01)
*H04N 7/173* (2011.01)

(52) U.S. Cl.
CPC ..... *H04N 21/47815* (2013.01); *H04N 7/17318* (2013.01)
USPC .......................................................... 725/60

(58) Field of Classification Search
CPC .................... H04N 21/47815; H04N 7/17318
USPC ................... 725/86–104; 705/9–26
See application file for complete search history.

(56) References Cited

U.S. PATENT DOCUMENTS

| 6,370,231 | B1 * | 4/2002 | Hice | 379/32.01 |
| 6,870,900 | B1 * | 3/2005 | Beamon | 379/9.03 |
| 7,428,503 | B1 * | 9/2008 | Groff et al. | 705/7.25 |
| 7,464,046 | B2 * | 12/2008 | Wilson et al. | 705/7.15 |
| 2007/0282656 | A1 * | 12/2007 | Battcher et al. | 705/8 |

* cited by examiner

*Primary Examiner* — Benjamin R Bruckart
*Assistant Examiner* — Anthony Bantamoi (57) ABSTRACT

A system and method in accordance with exemplary embodiments may receive, at a set top box, one or more user request messages to display order status information from an input device. The system and method may then output, to a display device, the order status information in response to receiving the one or more user request messages. Further, the system and method may receive, at the set top box, one or more user selection messages from the input device. Even further, the system and method may transmit, to a server, one or more order status update request messages based on the one or more user selection messages received via a network. The system and method may output, to the display device, order status update information in response to the one or more order status update request messages.

17 Claims, 6 Drawing Sheets

METHODS AND SYSTEMS FOR PROVIDING STATUS UPDATES ASSOCIATED WITH ONE OR MORE PENDING ORDERS

BACKGROUND INFORMATION

In response to the inability of service providers to provide accurate estimations of a technician's estimated time of arrival (ETA), service providers (e.g., cable television service providers, internet service providers, telephone service providers) may frequently supply customers with an ETA that spans a broad range of time (e.g., 8:00 AM to 12:00 PM, 10:00 AM to 2:00 PM). In some instances, customers may frequently call and request order status updates (e.g., a technician's ETA) from these services providers due to the uncertainty and inconvenience of inaccurate ETAs. Accordingly, service providers may desire a way to provide their customers with a more accurate ETA of their technicians.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

These and other embodiments and advantages will become apparent from the following detailed description, taken in conjunction with the accompanying drawings, illustrating by way of example the principles of the various exemplary embodiments.

DETAILED DESCRIPTION OF PREFERRED EMBODIMENTS

The description below describes servers, mobile devices, and network elements that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

The description below also describes physical and logical elements of a system, some of which are explicitly shown in figures, others that are not. The inclusion of some physical elements of a system may help illustrate how a given system may be modeled. It should be noted, however, that all illustrations are purely exemplary and that the order status system described herein may be performed on different varieties of systems which may include different physical and logical elements.

Figure 1:
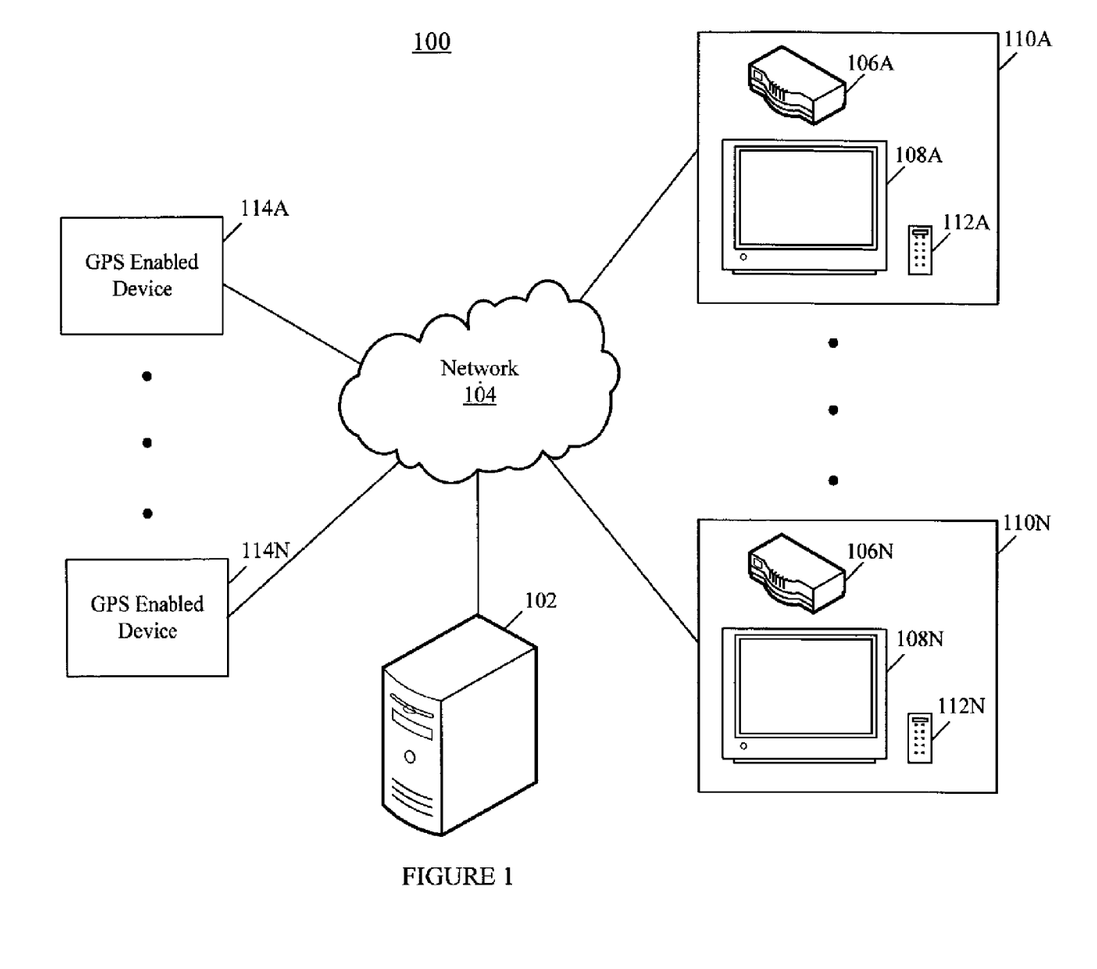
FIG. 1 illustrates a block diagram of an order status system in accordance with exemplary embodiments.

For instance, order status system 100 from FIG. 1 illustrates a simplified view of a system and various elements in the system. It is noted that other hardware and software not depicted may be included in the order status system 100. It is also noted that the order status system 100 illustrates a specific number of instances of a server 102, a network 104, a set top box 106, a display device 108, a user premise 110, an input device 112, and a Global Positioning System (GPS) enabled device. It will be appreciated that a single instance and/or multiple instances of these entities may be included in a system.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, mobile devices, and network elements, etc.) separately. The functions described as being performed at various components may be performed at other components, and the various components may be combined and/or separated. Other modifications also may be made.

In an exemplary embodiment, an order status system may be configured to output order status update information associated with one or more pending orders in response to a user request for the order status update information. In various embodiments, a pending order may include information associated with an outstanding request for a task to be performed by a technician. For example, a pending order may include information associated with an outstanding request for an upgrade in cable service at a customer premise by a cable service provider technician. In another example, a pending order may include information associated with an outstanding request for the installation of a set top box at a customer premise by a cable service provider technician. In yet another example, a pending order may include information associated with an outstanding request for the troubleshooting of internet service at a customer premise by an internet service provider technician. In various embodiments, order status update information may include information that indicates and/or approximates the estimated time of arrival (ETA) of one or more technicians at a customer premise to fulfill one or more pending orders.

In an exemplary embodiment, outputting order status update information associated with one or more pending orders may include retrieving and/or receiving order status update information from one or more Global Positioning System (GPS) enabled devices associated with one or more technicians. In an exemplary embodiment, outputting order status update information associated with one or more pending orders may include outputting the order status update information to the customer in a form that is desirable to the customer. For example, outputting order status update information may include displaying a technician's progress by displaying a virtual map using a display device. In another example, outputting order status update information may include providing audio updates using a display device. In an exemplary embodiment, a technician associated with the order status system may provide order status update information to the customer in response to receiving one or more requests for order status update information at a Global Positioning System (GPS) enabled device. For example, the technician may provide order status update information to the customer by calling the customer using a mobile device.

In various embodiments, the order status system may be configured to provide order status update information based on an approximate location of a Global Positioning System (GPS) enabled device associated with a technician. For example, the order status system may provide the region (e.g., city, county, township) in which the Global Positioning System (GPS) enabled device is located.

FIG. 1 illustrates a block diagram of an order status system 100 in accordance with exemplary embodiments. In exemplary embodiments, the order status system 100 may include a server 102 communicatively coupled to a network 104, one or more set top boxes 106 at one or more customer premises 110 communicatively coupled to the network 104, and one or more Global Positioning System (GPS) enabled devices 114 communicatively coupled to the network 104. The network 104 may communicate one or more location signals from the Global Positioning System (GPS) enabled device 114 to the server 102. It should be noted that the term "approximate location" may be used herein due to the built-in inaccuracies of Global Positioning System (GPS) technology. The location signals may include a geotag that references the location (e.g., latitude coordinates and longitude coordinates) of the Global Positioning System (GPS) enabled device 114. Based on one or more location signals, the network 104 may communicate order status update information signals from the server 102 to the set top box 106. The network 104 may communicate order status update request signals from the set top box 106 to the server 102.

The network 104 may be a wired network, a wireless network, and/or combinations thereof. The network 104 may transport the location signals and/or various messages in analog form and/or in digital form from the Global Positioning System (GPS) enabled device 114 to the server 102. The network 104 may transport the order status update information signals and/or various messages in analog form and/or digital form from the server 102 to the set top box 106. The network 104 may transport the order status update request signals and/or various messages in analog form and/or digital form from the set top box 106 to the server 102. In an exemplary embodiment, at least a portion of the network 104 may comply with the Telecommunication Union Telecommunication Standard (ITU-T) Recommendation G.983.1 titled "Broadband Optical Access Systems based on Passive Optical Networks (PON)," January 2005, the contents of which are incorporated herein by reference in its entirety. The network 104 also may comply with other standards. In an exemplary embodiment, the network 104 may communicate with the set top box 106 using three separate wavelengths, where one of the wavelengths may exchange data using a data communication session, such as, but not limited to, Internet Protocol, another wavelength may communicate order status update information signals to the set top box 106, and the last wavelength may receive messages from the set top box 106. The network 104 also may be a cable television network, a satellite network, fiber optic network, combinations thereof, or other networks capable of distributing an order status update information signal from the server 102 to the set top box 106, and exchanging information (e.g., messages, requests) between the server 102 and the set top box 106 via the network 104.

The order status update information signals may be, for example, video signals and/or audio signals that may be in digital or analog form, data, other digital information and/or analog information, and/or combinations thereof. The order status update information signal may be used to display order status update information at the display device 108. Order status update information may be video, audio, text, or other types of visually or audibly displayable information.

The customer premises 110A-N may each include a set top box 106 and a display device 108. FIG. 1 illustrates a set top box 106A, a display device 108A, and an input device 112A at customer premises 110A, and a set top box 106N, a display device 108N, and an input device 112N at customer premises 110N. It is also noted that a single customer premises 110 may include multiple set top boxes 106, multiple display devices 108, and multiple input devices 112. The set top box 106 also may be remotely located from the display device 108.

In an exemplary embodiment, the set top box 106 may be a hardware device that may receive an order status update information signal from the network 104 and may cause display of the order status update information signal at the display device 108. For example, the set top box 106 may cause display of the order status update information signal at a display device 108, such as, a television set.

In another example, the set top box 106 may be a computer (e.g., a laptop) and the display device 108 may be a computer monitor. It is noted that the set top box 106 and the display device 108 are depicted and described as being separate devices in FIG. 1. The set top box 106 and the display device 108, however, may be combined into a single unit. The functions performed by the set top box 106 and the display device 108 also may be implemented in a mobile phone, a wireless device, or any other device that may communicate via the network 104.

In an exemplary embodiment, the Global Positioning System (GPS) enabled device 114 may be a hardware device that may transmit location signals and/or various messages to the server 102 via the network 104. For example, the Global Positioning System (GPS) enabled device 114 may include wireless telephones, cellular telephones, mobile telephones, or satellite telephones, Personal Digital Assistants (PDA), portable computers, handheld MP3 players, handheld video players, personal media players, watches, gaming devices, Global Positioning System (GPS) navigation devices, portable televisions, or any other Global Positioning System (GPS) enabled device 114 that is capable of transmitting location signals. The set top box 106 and the server 102 are discussed in further detail below.

Figure 2:
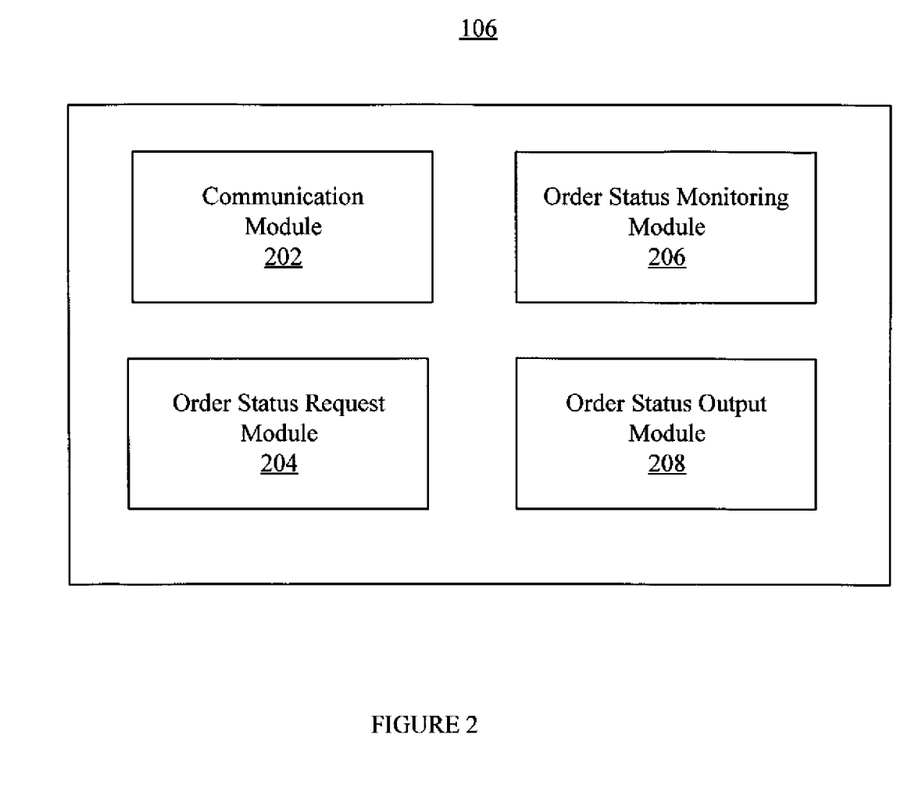
FIG. 2 illustrates exemplary modules of a set top box of an order status system in accordance with exemplary embodiments.

FIG. 2 illustrates exemplary modules of a set top box 106 in accordance with exemplary embodiments. In an exemplary embodiment, the set top box 106 may include a communication module 202, an order status request module 204, an order status monitoring module 206, and an order status output module 208. It is noted that the modules 202, 204, 206, and 208 are exemplary. The functions of the modules 202, 204, 206, and 208 may be performed by other modules remote or local to the set top box 106, and the modules 202, 204, 206, and 208 may be combined and/or separated.

The communication module 202 may include software and/or hardware configured to provide communication between the set top box 106 and the network 104. In various embodiments, the communication module 202 may be configured to transmit order status update information signals and/or messages received from the network 104 to the other modules 204, 206, and 208, and may communicate messages received from the modules 204, 206, and 208 to the network 104.

The order status request module 204 may include software and/or hardware configured to receive one or more user request messages to display order status information from an input device. For example, a customer may initiate one or more user request messages using an input device 112 (e.g., a remote control). In various embodiments, order status information may be associated with a plurality of order status menu options. In response to receiving the one or more user request messages to display order status information, the order status system 100 may output a graphical user interface (e.g., the order status menu options graphical user interface illustrated in FIG. 4) to a display device 108.

The order status request module 204 may include software and/or hardware configured to receive one or more user selection messages from an input device. In various embodiments, the order status request module 204 may receive one or more user selection messages that indicate a customer's selection of (e.g., request for) order status update information associated with a particular pending order to be requested from the server 102. For example, the order status request module 204 may receive one or more user selection messages that indicate a customer's request for order status update information associated with a pending order for an upgrade in cable service at the customer's premises 110. In another example, the order status request module 204 may receive one or more user selection messages that indicate a customer's request for order status update information associated with a pending order for the installation of a set top box at the customer's premises 110. In yet another example, the order status request module 204 may receive one or more user selection messages that indicate a customer's request for order status update information associated with a pending order for the troubleshooting of internet service at the customers premises 110.

The order status request module 204 may include software and/or hardware configured to formulate and/or create one or more order status update request messages. In various embodiments, order status request module 204 may be configured to formulate and/or create one or more order status update request messages based on the one or more user selection messages. In various embodiments, order status update request messages may include a pending order identification number. For example, the pending order identification number may indicate a particular pending order, such as, the pending order that is associated with the requested order status update information. Accordingly, the order status request module 204 may be configured to transmit one or more order status update request messages to the communication module 202 for transmission to the network 104 and/or the server 102.

The order status monitoring module 206 may include software and/or hardware configured to monitor order status update information received from the server 102. In various embodiments, the order status monitoring module 206 may be configured to monitor order status update information to determine whether there is a difference between current order status update information (e.g., most recently received order status update information) and previous order status update information (e.g., earlier received order status update information).

Determining whether there is a difference between current order status update information and previous order status update information may include the order status monitoring module 206 comparing the current order status update information to the previous order status update information (e.g., a bit by bit comparison). In various embodiments, the order status monitoring module 206 may determine that there is a difference between the current order status update information and the previous order status update information if the difference is greater than a threshold (e.g., a maximum difference threshold). For example, the order status monitoring module 206 may determine that there is a difference between the current order status update information and the previous order status update information if the approximate location of the Global Positioning System (GPS) enabled device 114 has changed by at least one-hundred (100) feet. In various embodiments, the order status monitoring module 206 may determine that there is not a difference between the current order status update information and the previous order status update information if the difference is less than a threshold (e.g., a minimum difference threshold). For example, the order status monitoring module 206 may determine that there is not a difference between the current order status update information and the previous order status update information if the approximate location of the Global Positioning System (GPS) enabled device 114 has not changed by at least fifty (50). In an exemplary embodiment, a maximum difference threshold may be equal to a minimum difference threshold. In various embodiments, one or more thresholds, such as, a maximum difference threshold and a minimum difference threshold may be determined by the implementers of the order status system 100 based on design preferences.

If, for example, the order status monitoring module 206 determines that there is a difference between the current order status update information and the previous order status update information, the order status monitoring module 206 may initiate the output of order status update information that indicates that the location of the Global Positioning System (GPS) enabled device 114 and/or the location of the technician associated with the Global Positioning System (GPS) enabled device 114 has changed. If, however, the order status monitoring module 206 determines that there is not a difference between the current order status update information and the previous order status update information, the order status monitoring module 206 may initiate the output of order status update information that indicates that the location of the Global Positioning System (GPS) enabled device 114 and/or the location of the technician associated with the Global Positioning System (GPS) enabled device 114 has not changed. In various embodiments, the order status monitoring module 206 may be configured to initiate the output of order status update information when there is a difference between the current order status update information and the previous order status update information.

The order status output module 208 may include software and/or hardware configured to control the output (e.g., display) of the order status update information signal, the order status information (e.g., a plurality of order status menu options), and/or various graphical user interfaces at the display device 108. To cause display of the order status update information signal, the order status output module 208 may receive instructions from the input device 112, may activate one or more particular order status output options based on the received instructions, and/or may cause the display of the order status update information signal at the display device 108 based on the one or more particular order status output options activated. For example, using the input device 112, a customer may request the order status output module 208 to output the order status update information signal in audio form. In another example, using the input device 112, a customer may request the order status output module 208 to output the order status update information signal in video form. In yet another example, using the input device 112, a customer may request the order status output module 208 to output the order status update information signal in audio form and video form. Accordingly, the order status output module 208 may cause the display of the order status update information signal at the display device 108 based on the one or more particular order status output options activated (e.g., requested).

The order status output module 208 may cause the display of an order status menu options graphical user interface (GUI) at the display device 108. The order status menu options graphical user interface (GUI) is discussed below in further detail.

Figure 3:
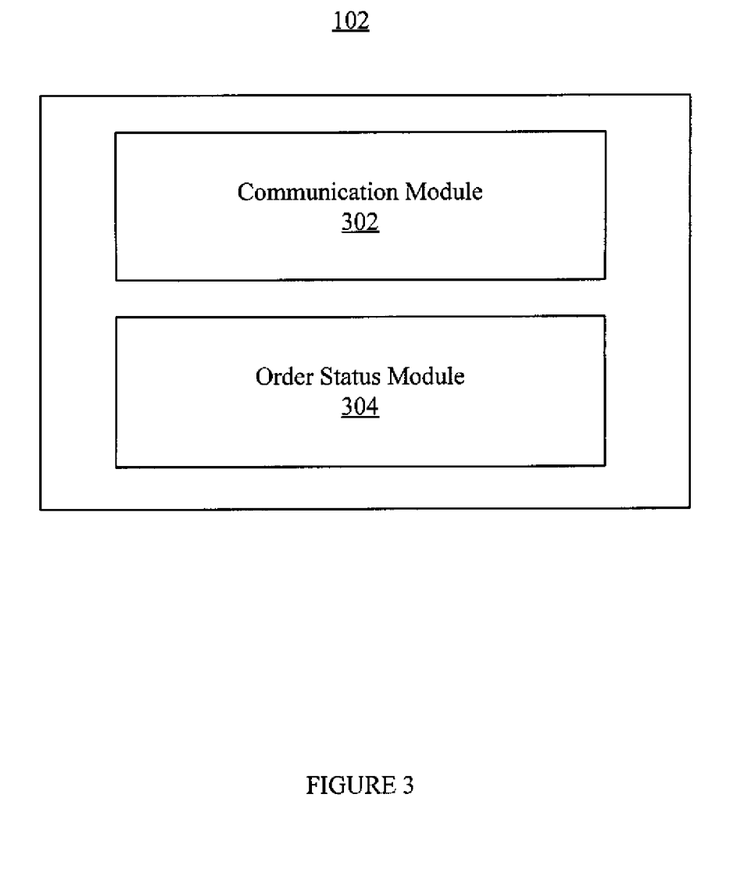
FIG. 3 illustrates exemplary modules of a server of an order status system in accordance with exemplary embodiments.

FIG. 3 illustrates exemplary modules of a server 102 in accordance with exemplary embodiments. In an exemplary embodiment, the server 102 may include a communication module 302 and an order status module 304. It is noted that the modules 302 and 304 are exemplary. The functions of the 302 and 304 may be performed by other modules remote or local to the server 102, and the modules 302 and 304 may be combined and/or separated.

The communication module 302 may include software and/or hardware configured to provide communication between the server 102 and the network 104. In various embodiments, the communication module 302 may be configured to receive one or more order status update request signals from one or more set top boxes 106 via the network 104. For example, the communication module 302 may receive one or more order status update request signals from one or more set top boxes 106 associated with one or more pending orders. In various embodiments, the communication module 302 may be configured to receive and/or retrieve location information (e.g., one or more location signals) from one or more Global Positioning System (GPS) enabled devices 114 via the network 104. For example, the communication module 302 may receive one or more location signals from one or more Global Positioning System (GPS) enabled devices 114 associated with one or more pending orders. In various embodiments, the communication module 302 may be configured to transmit one or more order status update signals to one or more set top boxes 106 in response to the receipt of one or more order status update request signals via the network 104. In various embodiments, the communication module 302 may be configured to transmit signals and/or messages received from the network 104 to other modules (e.g., 304) and may communicate signals and/or messages received from other modules (e.g., 304) to the network 104.

The order status module 304 may include software and/or hardware configured to process one or more order status update request signals received from one or more set top boxes 106. In various embodiments, processing one or more order status update request signals may include deciphering the pending order identification number associated with the order status update request signals. For example, the order status module 304 may process one or more order status update request signals associated with a pending order for an upgrade in cable service at the customer's premises 110 to decipher the pending order identification number (e.g., 123XYZ). In another example, the order status module 304 may process one or more order status update request signals associated with a pending order for the installation of a set top box at the customer's premises 110 to decipher the pending order identification number (e.g., 111222). In yet another example, the order status module 304 may process one or more order status update request signals associated with a pending order for the troubleshooting of internet service at the customers premises 110 to decipher the pending order identification number (e.g., 123456).

In an exemplary embodiment, the order status module 304 may be configured to generate one or more order status update information signals based on one or more locations signals. In various embodiments, one or more location signals may include a pending order identification number. Accordingly, the order status module 304 may generate one or more order status update information signals by accessing one or more location signals transmitted from a Global Positioning System (GPS) enabled device 114 that is associated with the pending order using the pending order identification number.

Figure 4:
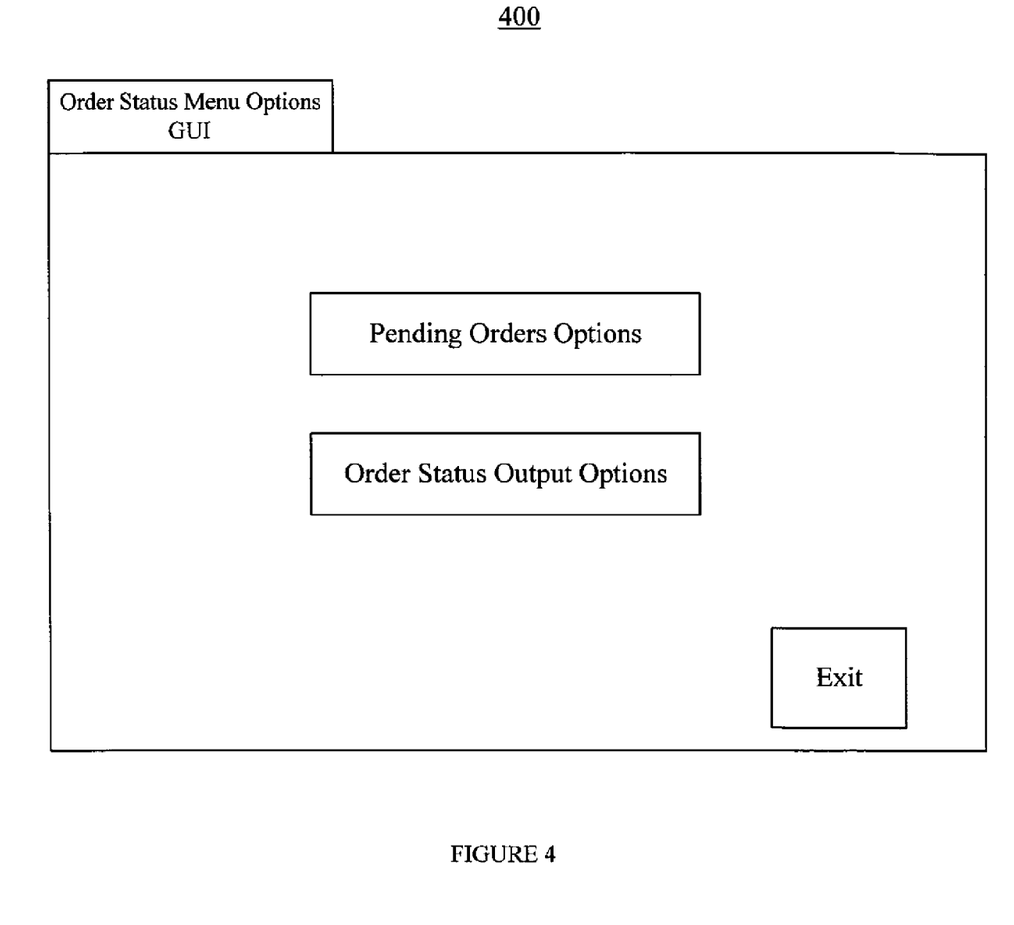
FIG. 4 illustrates an exemplary screen shot of an order status menu options graphical user interface in accordance with exemplary embodiments.

FIG. 4 illustrates an exemplary screen shot of an order status menu options graphical user interface 400 in accordance with exemplary embodiments. The order status menu options graphical user interface 400 may permit the customer to instruct the set top box 106 to retrieve and/or display order status information at the display device 108.

In an exemplary embodiment, the order status menu options graphical user interface 400 may be displayed in response to a customer request to view the order status menu options graphical user interface 400. For example, the customer may use an input device 112 (e.g., a remote control) to generate an order status menu options display request that requests the set top box 106 to cause display of the order status menu options graphical user interface 400 at the display device 108. In various embodiments, the customer may press a button associated with the input device 112 (e.g., an "order status" button) and/or access an order status menu option in a menu guide to generate an order status menu options display request. When the order status menu options display request is received, the order status output module 208 of the set top box 106 may generate and/or display the order status menu options graphical user interface 400.

In an exemplary embodiment, the order status menu options graphical user interface 400 may include one or more order status menu options. For example, the order status menu options graphical user interface may at least include pending order option information (e.g., a pending order option) and order status output option information (e.g., an order status output option). The customer may use the input device 112 to select one of the order status menu option fields. In an exemplary embodiment, the order status menu options graphical user interface 400 may include an indicator (not shown) to identify which order status menu option fields are selected, and the customer may press an input key on the input device 112 to generate a select message requesting that the set top box 106 activate and/or display information associated with the selected order status menu option. If, for example, the customer selects a pending order option field, the order status output module 208 may output (e.g., display in video form and/or play in audio form) information associated with one or more pending orders (e.g., pending order names, pending order identification numbers, pending order update requests). If, however, the customer selects the order status output option field, the order status output module 208 may output (e.g., display in video form and/or play in audio form) information associated with one or more order status output options (e.g., audio form order status output, video form order status output, live map information).

Figure 5:
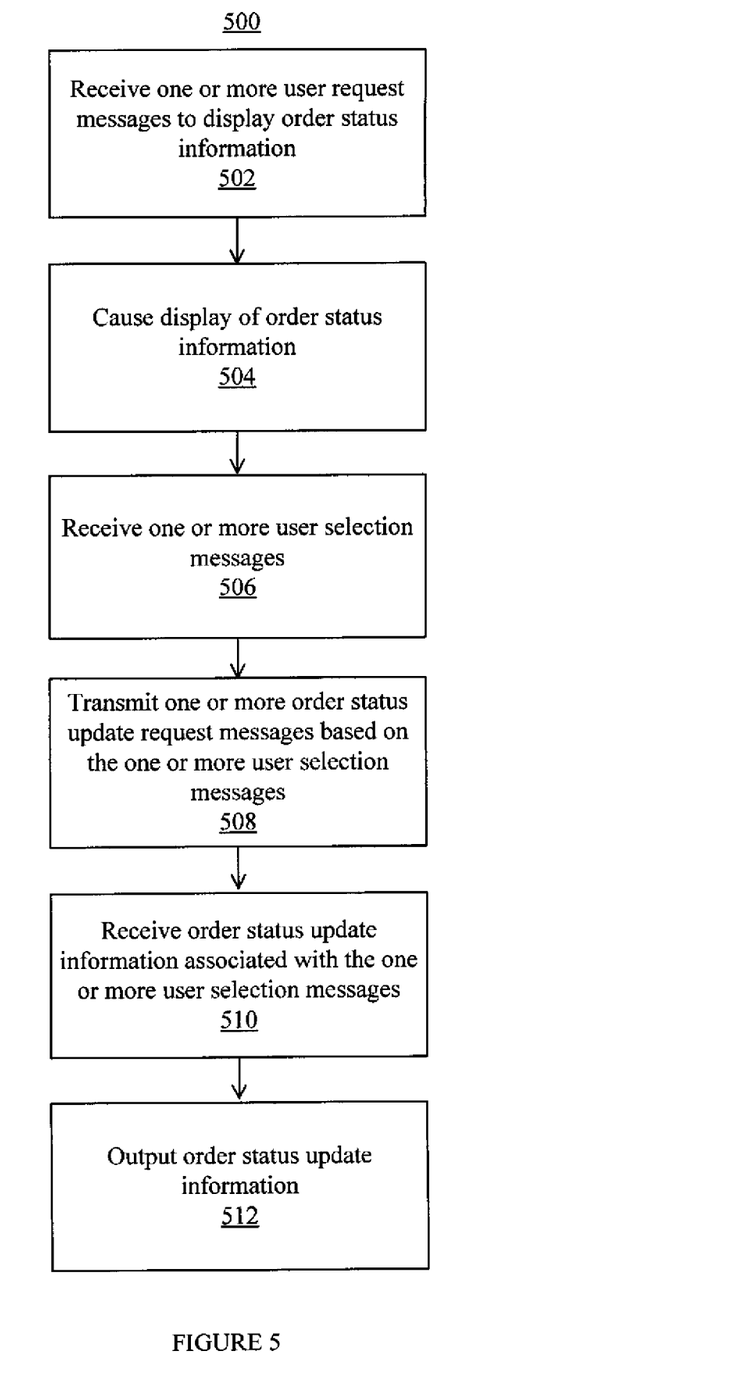
FIG. 5 illustrates a flowchart of method for providing status updates associated with one or more pending orders in accordance with exemplary embodiments.

FIG. 5 illustrates a flowchart of method 500 for providing status updates associated with one or more pending orders in accordance with exemplary embodiments. This exemplary method is provided by way of example, as there are a variety of ways to carry out methods disclosed herein. The method 500 shown in FIG. 5 can be executed or otherwise performed by one or a combination of various systems. The method 500 is described below as carried out by the order status system 100 shown in FIG. 1 by way of example, and various elements of the order status system 100 are referenced in explaining the example method 500 of FIG. 5. Each block shown in FIG. 5 represents one or more processes, methods, or subroutines carried in the exemplary method 500. Referring to FIG. 5, the exemplary method 500 may begin at block 502.

In block 502, the method 500 may include receiving one or more user request messages to display order status information. In an exemplary embodiment, a communication module 202 and/or an order status request module 204 may receive one or more user request messages to display order status information. For example, a customer may use an input device 112 to generate one or more user request messages. The method 500 may continue to block 504.

In block 504, the method 500 may include causing the display order status information. In an exemplary embodiment, the order status output module 208 may output (e.g., display) order status information in the form of one or more graphical user interfaces, such as, the order status menu options graphical user interface 400 illustrated in FIG. 4. In various embodiments, the order status output module 208 may output the order status information using the display device 108. The method 500 may continue to block 506.

In block 506, the method 500 may include receiving one or more user selection messages. In an exemplary embodiment, the communication module 202 and/or the order status request module 204 may receive one or more user selection messages from the input device 112. For example, a customer may use the input device 112 to generate one or more user selection messages. The method 500 may continue to block 508.

In block 508, the method 500 may include transmitting one or more order status update request messages based on the one or more user selection messages. In an exemplary embodiment, the order status request module 204 may generate and/or transmit one or more order status update request messages to the server 102 via the network 104. In an exemplary embodiment, the communication module 202 may transmit one or more order status update request messages generated by the order status request module 204 to the server 102 via the network 104. The method 500 may continue to block 510.

In block 510, the method 500 may include outputting order status update information. In an exemplary embodiment, the order status output module 208 may output (e.g., display) the order status update information received from the server 102 using a display device 108. In various embodiments, the order status output module 208 may output the order status update information in audio form, video form, and/or any other form decipherable by the customer based on customer inputs. The method 500 may then end.

Figure 6:
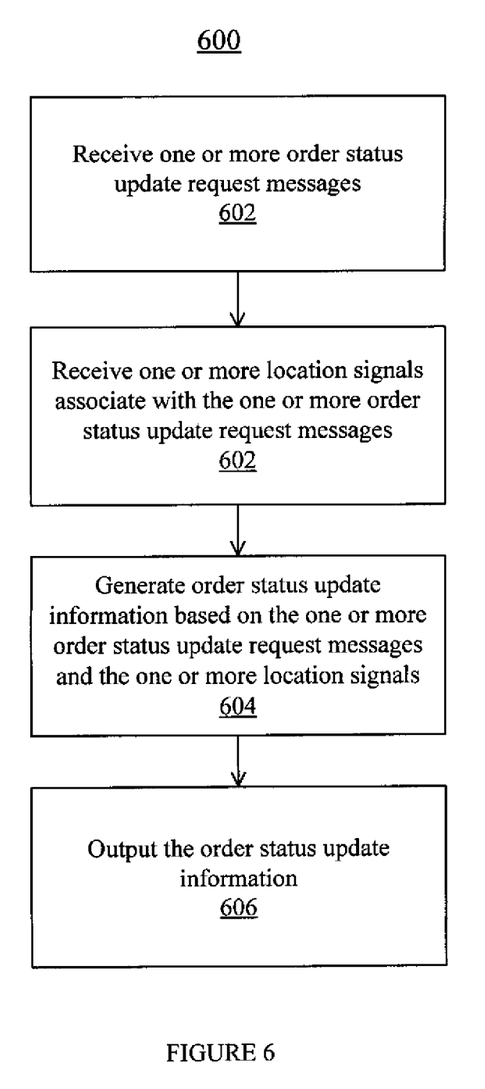
FIG. 6 illustrates a flowchart of another method for providing status updates associated with one or more pending orders in accordance with exemplary embodiments.

FIG. 6 illustrates a flowchart of another method 600 for providing status updates associated with one or more pending orders in accordance with exemplary embodiments. This exemplary method is provided by way of example, as there are a variety of ways to carry out methods disclosed herein. The method 600 shown in FIG. 6 can be executed or otherwise performed by one or a combination of various systems. The method 600 is described below as carried out by the order status system 100 shown in FIG. 1 by way of example, and various elements of the order status system 100 are referenced in explaining the example method 600 of FIG. 6. Each block shown in FIG. 6 represents one or more processes, methods, or subroutines carried in the exemplary method 600. Referring to FIG. 6, the exemplary method 600 may begin at block 602.

In block 602, the method 600 may include receiving one or more order status update request messages. In an exemplary embodiment, a communication module 302 and/or an order status module 304 may receive one or more order status update request messages associated with one or more pending orders from one or more set top boxes 106 via the network 104. The method 600 may continue to block 604.

In block 604, the method 600 may include receiving one or more location signals associated with the one or more order status update request messages. In an exemplary embodiment, a communication module 302 may automatically and/or periodically receive one or more location signals associated with the one or more order status update request messages from one or more Global Positioning System (GPS) enabled device 114 via the network 104. In an exemplary embodiment, a communication module 302 may receive one or more location signals associated with the one or more order status update request messages from one or more Global Positioning System (GPS) enabled device 114 via the network 104 in response to a request from the server 102. The method 600 may continue to block 606.

In block 606, the method 600 may include generating order status update information based on the one or more order status update request messages and the one or more location signals. In an exemplary embodiment, the order status module 304 may generate order status update information based on the one or more order status update request messages and the one or more location signals by deciphering one or more pending order identification numbers associated with the one or more order status update request messages and/or the one or more location signals. Accordingly, the order status module 304 may generating order status update information by processing the one or more order status update request messages and/or the one or more location signals. The method 600 may continue to block 608.

In block 608, the method 600 may include transmitting order status update information. In an exemplary embodiment, the communication module 302 and/or the order status module 304 may transmit the order status update information to one or more set top boxes 106 via the network 104. In an exemplary embodiment, a display device 108 may output (e.g., display in video form and/or play in audio form) the order status update information to the customer. The method 600 may then end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
    receiving, at a set top box, one or more user request messages to display order status information from an input device, wherein the order status information indicates a status of a technician's arrival at a customer's premises based on the current location of the technician as determined by a Global Positioning System;
    outputting, to a display device, the order status information in response to receiving the one or more user request messages;
    receiving, at the set top box, one or more user selection messages from the input device;

transmitting, to a server, one or more order status update request messages based on the one or more user selection messages received via a network;

outputting, to the display device, order status update information in response to the one or more order status update request messages, wherein the order status update information indicates a status of a technician's arrival at a customer's premises based on the current location of the technician as determined by the Global Positioning System, wherein the order status update information comprises at least a virtual map indicating the technician's progress based on the current location of the technician as determined by the Global Positioning System; and monitoring the order status update information to determine whether there is a difference between current order status update information and previous order status update information.

2. The method of claim 1, wherein the order status information includes a plurality of order status menu options, wherein the plurality of order status menu options is associated with at least one of pending order option information and order status output option information.

3. The method of claim 1, further comprising receiving, from the server, the order status update information in response to the one or more order status update request messages via the network.

4. The method of claim 1, wherein outputting order status update information further comprises outputting order status update information in at least one of an audio form and a video form.

5. The method of claim 1, wherein the network is a passive optical network (PON).

6. A non-transitory tangible computer readable media comprising code to perform the acts of the method of claim 1.

7. The method of claim 1, further comprising:
determining, based on the monitoring, whether the difference between the current order status update information and previous order status update information is less than a first threshold value; and
outputting, to the display device, order status information indicating that the location of the technician has not changed if the difference between the current order status update information and previous order status update information is less than the first threshold value.

8. The method of claim 7, further comprising:
determining, based on the monitoring, whether the difference between the current order status update information and previous order status update information is greater than a second threshold value; and
outputting, to the display device, order status information indicating that the location of the technician has changed if the difference between the current order status update information and previous order status update information is greater than the second threshold value.

9. A system, comprising one or more hardware modules configured to:
receive, at a set top box, one or more user request messages to display order status information from an input device, wherein the order status information indicates a status of a technician's arrival at a customer's premises based on the current location of the technician as determined by a Global Positioning System;
output, to a display device, the order status information in response to receiving the one or more user request messages;
receive, at the set top box, one or more user selection messages from the input device;

transmit, to a server, one or more order status update request messages based on the one or more user selection messages received via a network;

output, to the display device, order status update information in response to the one or more order status update request messages, wherein the order status update information indicates a status of a technician's arrival at a customer's premises based on the current location of the technician as determined by the Global Positioning System, wherein the order status update information comprises at least a virtual map indicating the technician's progress based on the current location of the technician as determined by the Global Positioning System; and monitor the order status update information by monitoring the order status update information to determine whether there is a difference between current order status update information and previous order status update information.

10. The system of claim 9, wherein the order status information includes a plurality of order status menu options.

11. The system of claim 10, wherein the plurality of order status menu options is associated with at least one of pending order option information and order status output option information.

12. The system of claim 9, wherein the one or more hardware modules are further configured to receive, from the server, the order status update information in response to the one or more order status update request messages via the network.

13. The system of claim 9, wherein the one or more hardware modules are further configured to output order status update information by outputting order status update information in at least one of an audio form and a video form.

14. The system of claim 9, wherein the network is a passive optical network (PON).

15. The system of claim 9, wherein the one or more hardware modules are further configured to:
determine whether the difference between the current order status update information and previous order status update information is less than a first threshold value, and
output order status information indicating that the location of the technician has not changed if the difference between the current order status update information and previous order status update information is less than the first threshold value.

16. The system of claim 15, wherein the one or more hardware modules are further configured to:
determine whether the difference between the current order status update information and previous order status update information is greater than a second threshold value; and
output order status information indicating that the location of the technician has changed if the difference between the current order status update information and previous order status update information is greater than the second threshold value.

17. A method, comprising:
receiving, at a set top box, one or more user request messages to display order status information from an input device, wherein the order status information indicates a status of a technician's arrival at a customer's premises based on the current location of the technician as determined by a Global Positioning System;
outputting, to a display device, the order status information in response to receiving the one or more user request messages;

receiving, at the set top box, one or more user selection messages from the input device;

transmitting, to a server, one or more order status update request messages based on the one or more user selection messages received via a network;

receiving, from the server, the order status update information via the network;

monitoring the order status update information to determine whether there is a difference between current order status update information and previous order status update information; and outputting, to the display device, order status update information associated with the one or more user selection messages received, wherein the order status update information indicates a status of a technician's arrival at a customer's premises based on the current location of the technician as determined by the Global Positioning System, wherein the order status update information comprises at least a virtual map indicating the technician's progress based on the current location of the technician as determined by the Global Positioning System.

\* \* \* \* \*